O. KUEPPERS.

Neck-Ties.

No. 133,457.  Patented Nov. 26, 1872.

Witnesses.
C. Wahlers,
Ernst Bilhuber.

Inventor.
Otto Kueppers,
By VanSantvoord Hauff
his attys

UNITED STATES PATENT OFFICE.

OTTO KUEPPERS, OF UNION HILL, NEW JERSEY.

IMPROVEMENT IN NECK-TIES.

Specification forming part of Letters Patent No. 133,457, dated November 26, 1872.

*To all whom it may concern:*

Be it known that I, OTTO KUEPPERS, of Union Hill, in the county of Hudson and State of New Jersey, have invented a new and useful Improvement in Neck-Ties; and I do hereby declare the following to be a full, clear, and exact description thereof, which will enable those skilled in the art to make and use the same, reference being had to the accompanying drawing forming part of this specification, in which drawing—

Figure 3:
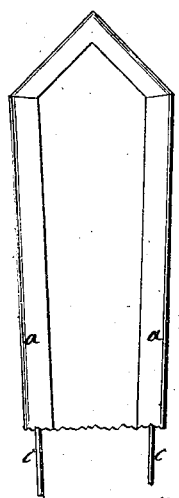
Figure 1:
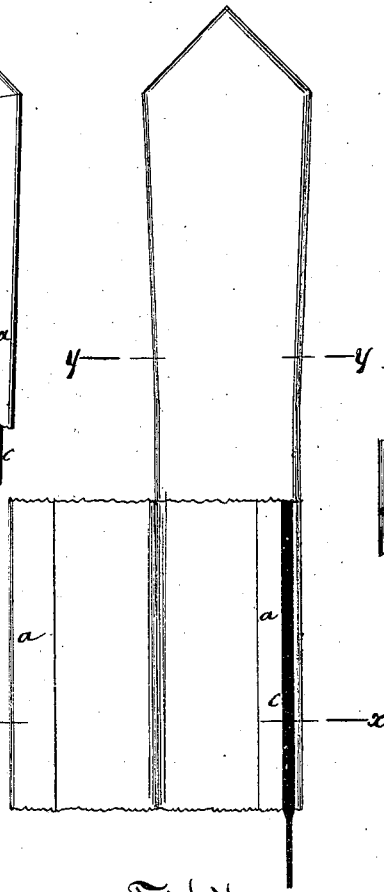
Figure 2:
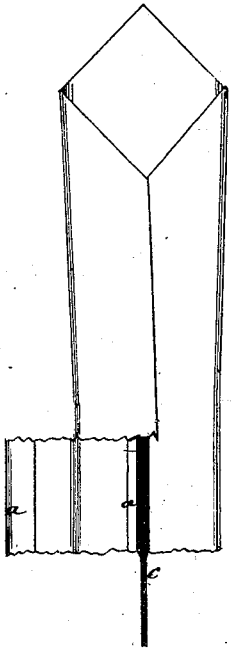
Figure 4:
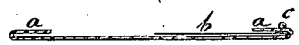
Figure 5:

Figure 1 shows part of my neck-tie, a portion being unfolded to show the interior. Fig. 2 is a similar view of a part of a neck-tie where the edges are united in the center. Fig. 3 is a similar view of a part of a neck-tie where the edges are simply folded over. Fig. 4 is a transverse section in the plane $x\ x$, Fig. 1. Fig. 5 is a similar section in the plane $y\ y$, Fig. 1.

Similar letters indicate corresponding parts.

This invention relates to neck-ties and bows, which are usually formed of silk or other fine material, and arranged to go round the neck and to be tied at its ends in a bow in front, or to be secured to the neck-band of a shirt or collar in any desirable manner. My invention consists in constructing the neck-tie by means of cement, applied by interposing between its folds one or more strips of India rubber or gutta-percha, and then exposing the same to the action of a heated flat-iron or of heated pressing-rollers, in such a manner as to unite the folds to each other and complete the neck-tie, thereby dispensing with stitching in uniting the folds or edges to each other.

In carrying out my invention I take a strip of silk or satin, or other suitable material for a neck-tie, of a proper width and length, and fold its edges inwardly, as seen at $a\ a$, placing under one of the folds a strip of stiffening material, $c$, of about the width which the finished neck-tie is to have. Upon the face of one of the folds $a$ I place, with care, a narrow strip of India rubber or gutta-percha, $c$, which I arrange within the outer edge of the fold, so that when the folds are brought together to form the neck-tie the strip $c$ will not be exposed, but a margin will be left between the outer edge of the cement and the outer edges of the folds. The folds of the neck-tie are then brought together, and heat and pressure are applied thereto, either by passing it, in its folded state, between heated rollers or pressing it with a heated flat-iron, so as to warm the strip $c$ and cause the folds to adhere to each other.

If the neck-tie is made as shown in Fig. 3 the strips $c$, of India rubber or gutta-percha, are placed beneath the folds $a\ a$, and, by exposing the same to the action of a heated flat-iron or of heated pressing-rollers, the folds are secured in position.

If the neck-tie is made in the form shown in Figs. 1 and 2 the stiffening can be inserted after the folds are made to adhere, instead of before; and in that case the ends of the tie are left unfastened, so that the strip of stiffening can be drawn in and adjusted, and after that is done the ends of the folds can be fastened together by adhesive material or by sewing.

My invention is applicable, also, to the construction of bows, and in this case the edges are turned over and cemented in position, as shown in Fig. 3.

I am aware that layers of textile material have before been united by means of India rubber and other adhesive compounds; therefore I do not wish to be understood as broadly claiming the principle of such union; but

What I claim as new, and desire to secure by Letters Patent, is—

As a new article of manufacture, a neck-tie or bow formed by cementing its folds to each other by interposing between them a strip of India rubber or gutta-percha, and then exposing the same to a heated flat-iron or other equivalent device, substantially as described.

OTTO KUEPPERS.

Witnesses:
W. HAUFF,
E. F. KASTENHUBER.